United States Patent [19]
Glenn

[11] Patent Number: 6,086,208
[45] Date of Patent: Jul. 11, 2000

[54] LIGHT VALVE PROJECTOR APPARATUS AND TECHNIQUE

[75] Inventor: William E. Glenn, Ft. Lauderdale, Fla.

[73] Assignee: Florida Atlantic University, Boca Raton, Fla.

[21] Appl. No.: 09/206,578

[22] Filed: Dec. 7, 1998

Related U.S. Application Data

[60] Provisional application No. 60/067,861, Dec. 8, 1997.

[51] Int. Cl.[7] ................................... G03B 21/00
[52] U.S. Cl. ............................... 353/31; 353/34; 353/37; 349/8; 349/201; 359/566; 359/569; 348/750
[58] Field of Search ................................. 359/51, 52, 66, 359/74, 94, 95, 566, 569; 353/20, 31, 33, 38; 349/136, 143, 144, 180, 8, 201; 348/750

[56] References Cited

U.S. PATENT DOCUMENTS

| | | | |
|---|---|---|---|
| Re. 25,169 | 5/1962 | Glenn | 178/5.4 |
| 3,882,271 | 5/1975 | Glenn | 178/7.3 D |
| 4,724,467 | 2/1988 | Yip et al. | 355/71 |
| 4,779,024 | 10/1988 | Roussin | 313/432 |
| 4,856,869 | 8/1989 | Sakata et al. | 350/162.18 |
| 5,231,432 | 7/1993 | Glenn | 353/31 |
| 5,237,435 | 8/1993 | Kurematsu et al. | 359/41 |
| 5,299,289 | 3/1994 | Omae et al. | 359/95 |
| 5,300,942 | 4/1994 | Dolgoff | 345/32 |
| 5,353,133 | 10/1994 | Bernkopf | 359/41 |
| 5,430,562 | 7/1995 | Fushimi et al. | 359/40 |
| 5,748,275 | 5/1998 | Sato et al. | 349/144 |

OTHER PUBLICATIONS

W.E. Glenn, C.E. Holton, G.J. Dixon, and P.J. Bos, "High Efficiency Light Valve Projectors and High Efficiency Laser Light Sources", Presented at the 137th SMPTE Technical Conference in New Orleans Sep. 6–9, 1995.

W. Glenn, C. Holton, G. Dixon, "Efficient Liquid Crystal Light Valves", Society Of Photo–Optical Instrumentation Engineers, 1995.

*Primary Examiner*—Safet Metjahic
*Assistant Examiner*—E P LeRoux
*Attorney, Agent, or Firm*—Martin Novack

[57] ABSTRACT

A method is disclosed for displaying images represented by electronic image information, including the following steps: providing a light source; optically modulating light from the light source, the optical modulation utilizing a pixel pattern and a diffraction grating, the pixel pattern being modulated with the image information; providing a schlieren optical system for operating on the optically modulated light; and displaying an output of the schlieren optical system; the diffraction grating being provided with a grating spacing that differs from the pixel spacing of the pixel pattern by an odd multiple of half the grating spacing.

20 Claims, 3 Drawing Sheets

LIGHT VALVE PROJECTOR APPARATUS AND TECHNIQUE

RELATED APPLICATION

The present Application claims priority from U.S. Provisional Patent Application No. 60/067,861, filed Dec. 8, 1997, and said Provisional Patent Application is incorporated herein by reference.

FIELD OF THE INVENTION

This invention relates to projection of images and, more particularly, to an improved apparatus and method for projecting and displaying images using an electro-optical system that includes a diffraction grating.

BACKGROUND OF THE INVENTION

A light valve projector projects a bright light source through an electro-optical system that receives electronic image information and produces a projected optical image. Light-valve projectors are rapidly converting to matrix driven arrays; examples being active-matrix LCD projectors such as the projector disclosed in U.S. Pat. No. 5,231,432 and the DMD projector of Texas Instruments Company which uses technology originating from the type of solid state light modulator disclosed in U.S. Pat. 3,882,271. Projectors of this type employ a diffraction grating, and a substantial fraction of the light is diffracted by the electrode pattern itself. Typically 30% of the incident light is diffracted by the electrode pattern. This not only reduces the optical efficiency, it also reduces the maximum contrast ratio that can be obtained. The conventional solution is to use a small aperture projection lens in order to get better contrast. This severely limits the light output for a given panel size. On all but highly coherent laser sources the light output is limited by the intrinsic brightness of the light source, the panel clear aperture area, and the projection lens aperture.

It is among the objects of the present invention to provide a solution to the indicated limitations of the prior art, and to generally improve operation of light valve projectors that employ a diffraction grating.

SUMMARY OF THE INVENTION

The present invention provides a solution to the above described limitations of the prior art by reducing losses resulting from diffraction caused by the pixel pattern itself, thereby increasing optical efficiency and contrast. In accordance with a feature of the present invention, the diffraction grating is configured to produce diffraction that falls in the slots of the output schlieren bar system. This is achieved by having the grating spacing differ from the pixel spacing by ½ cycle per pixel or an odd multiple of ½ cycle per pixel. In other words, the grating spacing differs from the pixel spacing by an odd multiple of half the grating spacing.

In accordance with a form of the invention there is set forth an apparatus for displaying images represented by electronic image information, comprising: a light source; means for optically modulating, with image information, light from the light source, the modulating means having a pixel pattern and a diffraction grating, the pixel pattern being modulated with the image information; a schlieren optical system for operating on the optically modulated light; and means for displaying an output of the schlieren optical system; the diffraction grating having a grating spacing that differs from the pixel spacing of the pixel pattern by an odd multiple of half the grating spacing. In an embodiment of the invention, the pixel spacing is $S_P$, the grating spacing is $S_G$, and the grating spacing is related to the pixel spacing by $$S_G = (2/m)S_P$$

where m=1, 3, 5, 7 . . . .

In the described types of diffractive systems, producing a phase shift of 180° every other pixel produces the desired maximum modulation. By doing this the projection lens can have a very large aperture without losing contrast. The projector output can thus be much higher for a given panel size. The diffracted light that falls within the projection lens aperture can add to the light output since it is also modulated by the modulating grating. Consequently, not only is the maximum light output and contrast increased—the optical efficiency is also increased.

Further features and advantages of the invention will become more readily apparent from the following detailed description when taken in conjunction with the accompanying drawings.

DETAILED DESCRIPTION

Figure 1:
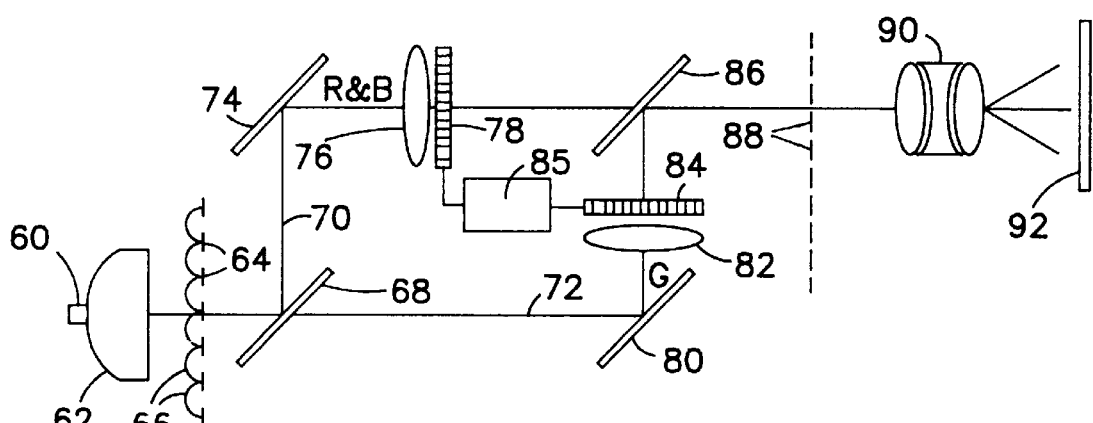
FIG. 1 is a schematic diagram of a display apparatus that can be utilized in practicing embodiments of the invention.

Examples of the general types of systems in which the present invention can be employed are set forth in my U.S. Pat. Nos. 3,882,271 and 5,231,432, which are incorporated herein by reference. FIG. 1 shows a simplified schematic diagram of the optical system of a color projector as disclosed in my U.S. Pat. No. 5,231,432 and which can be used in practicing embodiments of the present invention. Light from a source of white light, such as a metal halide lamp 60, is formed into parallel optical beams by a dichroic reflector 62 of known construction that also removes harmful infrared and ultraviolet radiation. The parallel optical beams are directed through an input light mask (64) component of a schlieren optical system comprising an array of bars between which there are transparent areas or slits, whereby the light transmitted by each transparent area appears to originate from a different source of light. As described in detail in the referenced '432 Patent, in order to maximize the transmission of light through the light mask the parallel optical beams from the source are focussed onto the slits by a lenticular lens plate 66 registered with the array of bars. The optical beams transmitted by the light mask 64 are directed onto a green-magenta dichroic mirror 68 which splits the beams into a magenta beam 70 (red and blue) and a green beam 72. The magenta beam 70 is reflected by a heat transmitting reflection mirror 74 onto and through a schlieren lens 76 to illuminate an LC panel 78, referred to as a "magenta" panel. The green beam 72 is reflected by a mirror 80 onto and through a second schlieren lens 82 to illuminate a second LC panel 84, referred to as a "green" panel. As described in the referenced '432 Patent, as each of the beams 70 and 72 passes through its respective LC panel, the red, blue and green components of the light from the source are selected by diffraction and their intensities modulated in accordance with processed video signals applied to the panels by associated electronic circuitry 85. The modulated beams are recombined by a second green-magenta dichroic mirror 86, and the combined beam is directed through an output light mask 88 comprising an array of schlieren bars, and projected onto a screen 92 by a projection lens 90. The LC panels 78 and 84 each function as light modulating medium, the light modulating characteristics of which are controlled in accordance with color intelligence signals by applying the signals to the panels which include, in addition to the matrix electrodes, a structure of interdigital electrodes which form a color-selecting diffraction grating. As is known, for example, from applicant's U.S. Pat. No. Re. 25,169 for "Colored Light System" (also incorporated herein by reference) and several others of his patents directed to the "Talaria" light-valve projector previously manufactured by General Electric Company, a diffraction grating is a light transmitting or reflecting medium which breaks up a ray of monochromatic light into a series of light and dark bands, or white light into colored bands of the spectrum of light present in the ray.

In the system described in the referenced U.S. Pat. No. Re 25,169, a diffraction grating is formed by distorting the surface of a medium so that light projected through or reflected from the medium is diffracted into its component colors. The respective color components follow paths which deviate from a line normal to the effective plane of the medium by an amount which is a function of the wavelength of the particular color component. The system of the Re '169 Patent utilizes a system of bars and slits which are so oriented with respect to the medium that the wavelength of the light that is passed by the slit system is controlled by the modulating medium. Three diffraction gratings are effectively superimposed on the modulating medium to form a single composite grating so that a color image is passed by the system of slits which corresponds to the color intelligence applied to distort the modulating medium. In the system of the referenced '432 Patent, two diffraction gratings, each comprising a system of bars and slits, are embodied in the "magenta" LC panel 78, and a third diffraction grating also comprising a system of bars and slits is embodied in the "green" LC panel 84. The bars and slits of each grating are so oriented with respect to the liquid crystal material of the respective panel that the wavelength of the light that is passed by each slit system corresponds to the color intelligence applied to the LC panel to distort the LC modulating medium. The LC panels are preferably constructed of a birefringent material such as a nematic liquid crystal. As described in the referenced '432 Patent, each of the diffraction gratings is controlled by a system of electrodes incorporated in the LC panel which form a system of bars and slits which, when a potential corresponding to color intelligence is applied to the LC panel, periodically modulates the index of refraction of the birefringent material, thus producing a phase diffraction grating that diffracts incident light, regardless of its polarization.

Figure 2:
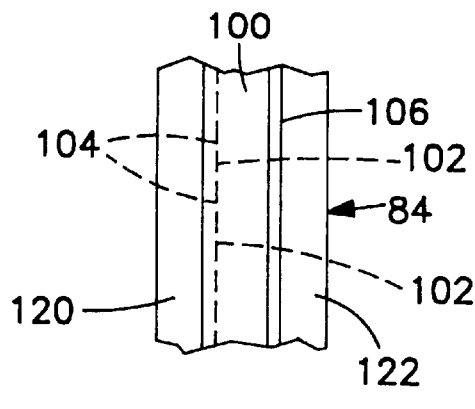
FIG. 2 is a diagrammatic side view of a fragmentary portion of one of the active matrix liquid crystal display panels of the FIG. 1 apparatus.
Figure 3:
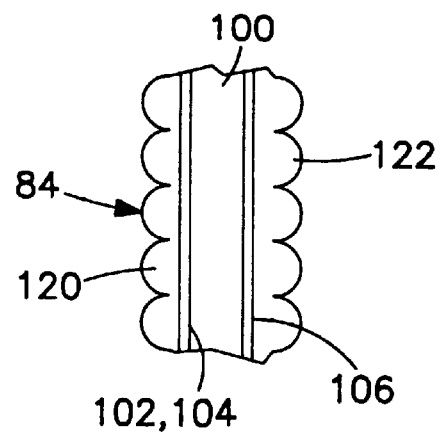
FIG. 3 is a diagrammatic top view of a fragmentary portion of one of the active matrix liquid crystal display panels of the FIG. 1 apparatus.

FIGS. 2 and 3 are, respectively, diagrammatic side and top views of a fragmentary portion of the "green" active matrix LCD panel 84, as in the referenced '432 Patent. The panel contains a matrix of a sufficient number of column and row electrodes and transistors (e.g., 1024×1440) to form 1.5 million pixels so as to be suitable for projection of HDTV, and utilizes a birefringement liquid crystal material, such as nematic liquid crystal. Transparent electrodes 102 are incorporated within the display area of the matrix interdigitally with the transparent row electrodes of the standard matrix. The electrodes 102 and 104 are disposed on the substrate of the active matrix on one side of the liquid crystal material 100 and a grounded electrode 106 is disposed on the other side. The matrix electrodes are not shown in FIGS. 2 and 3, the interrelationship of the interdigital and matrix electrodes being described in further detail in the referenced '432 Patent. AS also described in the '432 Patent, the electrodes 102 which form a system of bars and slits may have a spacing in the range from 3.5 to 5 cycles per pixel, which is approximately 20% longer wavelength than that used for blue. However, since only green light passes through the "green" panel, it does not have to select color at all; the grating wavelength being chosen to give the best efficiency for green; that is, to diffract green light from the center of a bar to the center of the nearest slit in the schlieren bars.

Figure 4:
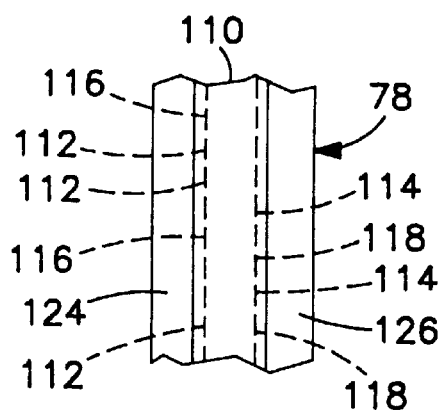
FIG. 4 is a diagrammatic side view of a fragmentary portion of another of the active matrix liquid crystal display panels of the FIG. 1 apparatus.
Figure 5:
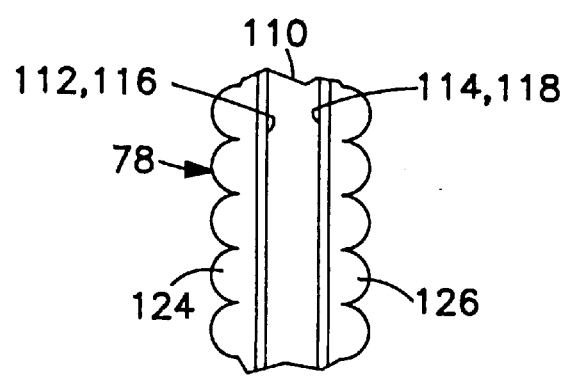
FIG. 5 is a diagrammatic top view of a fragmentary portion of another of the active matrix liquid crystal display panels of the FIG. 1 apparatus.

FIGS. 4 and 5 are side and top views, respectively, of a fragmentary portion of the "magenta" panel 78, again without the matrix electrodes, which is similar in construction to panel 84 except that it contains two systems of interdigital electrodes disposed on opposite sides of the liquid crystal material 110. As described in the referenced '432 Patent, a first system 116 having electrodes spaced for red, in the range from 4 to 8 cycles per pixel, is positioned near the transparent input electrode 112, and a second system 118 having electrodes spaced for blue, in the range from 3 to 6 cycles per pixel, is positioned near the transparent output electrode 114. That is to say, the spacing of the "red" electrodes is approximately three-fourths the spacing of the "blue" electrodes. The number of cycles per pixel, for red and blue, is chosen to be proportioned to the wavelength transmitted through the schlieren optical system. As a result of the differing spacings of the "red" and "blue" electrodes, and the fact that the applied magenta light passes through superimposed "red" and "blue" diffraction gratings, the diffraction process separates red from blue, which are at opposite ends of the visible spectrum. When red light is passed by the panel, blue light is diffracted to hit the schlieren bars 88; conversely, when the panel passes blue light, red light is diffracted to hit the schlieren bars 88. As described in the referenced '432 Patent, all higher order diffracted light also hits the bars of the output mask. All three colors are diffracted in the vertical direction.

Figure 6:
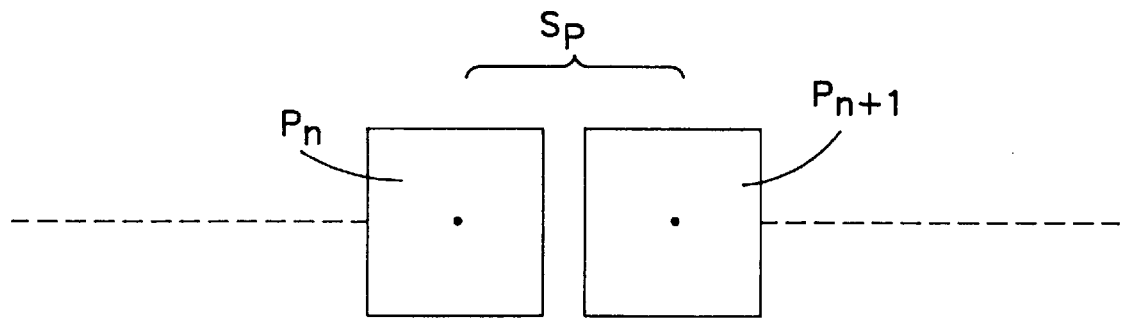
FIG. 6 is a simplified diagram of two representative pixels of a pixel pattern, useful in describing an embodiment of the invention.
Figure 7:
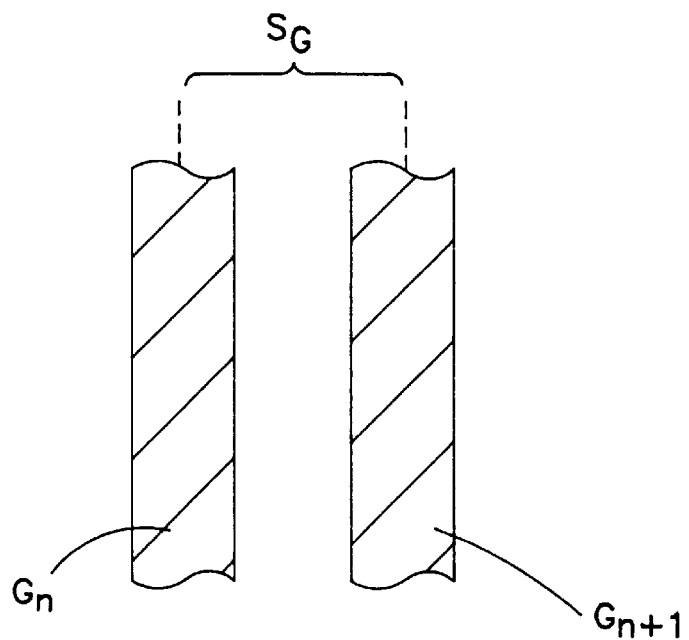
FIG. 7 is a simplified diagram of two representative grating bars of a diffraction grating, useful in describing an embodiment of the invention.

In accordance with a feature of the present invention, the diffraction grating is configured to produce diffraction that falls in the slots of the output schlieren bar system. This is achieved by having the grating spacing differ from the pixel spacing by ½ cycle per pixel or an odd multiple of ½ cycle per pixel. In other words, the grating spacing differs from the pixel spacing by an odd multiple of half the grating spacing. This is illustrated in the simplified diagrams of FIGS. 6 and 7. FIG. 6 illustrates adjacent pixels $P_n$ and $P_{n+1}$, having a pixel spacing $S_p$. [The pixels are square pixels in this illustration. For, say, rectangular pixels, the relevant spacing would be the spacing in the direction that is transverse the direction of the grating bars.] FIG. 7 illustrates diffraction grating bars $G_n$ and $G_{n=1}$ having a grating spacing $S_G$. Thus, the grating spacing, $S_G$, should differ from the pixel spacing, $S_p$, by an odd multiple of half $S_G$. This is achieved by providing:

$$S_G = (2/m)S_p$$

for m = 1, 3, 5, 7 . . . .

This results in:

$S_G = 2S_p$
$S_G = (\frac{2}{3}) S_p$
$S_G = (\frac{2}{5}) S_p$
$S_G = (\frac{2}{7}) S_p$ etc.

For example, if the pixel spacing is 50 microns, the grating spacing should be selected from: 100 microns, 33.3 microns, 20 microns, 14.3 microns, etc. At each of these grating spacings, the grating spacing differs from the pixel spacing by an odd multiple of half the grating spacing. More cycles per pixel results in better projected resolution. However, ½ grating cycle difference per pixel (that is, $S_G = 2S_p$) has less chromatic aberration if broad-band light is used, and still provides an acceptable modulation transfer function. In the described types of diffractive systems, producing a phase shift of 180° every other pixel produces the desired maximum modulation. By doing this the projection lens can have a very large aperture without losing contrast. The projector output can thus be much higher for a given panel size. The diffracted light that falls within the projection lens aperture can add to the light output since it is also modulated by the modulating grating. Consequently, not only is the maximum light output and contrast increased—the optical efficiency is also increased.

The invention has been described with reference to a particular preferred embodiment, but variations within the spirit and scope of the invention will occur to those skilled in the art. For example, while a liquid crystal panel system has been described, the invention also has application to other types of modulation and diffraction techniques, such as systems which employ a diffraction grating formed by an electrostatically deflected medium.

What is claimed is:

1. Apparatus for displaying images represented by electronic image information, comprising:

a light source;

means for optically modulating, with image information, light from said light source, said modulating means having a pixel pattern and a diffraction grating, the pixel pattern being modulated with said image information;

a schlieren optical system for operating on said optically modulated light; and means for displaying an output of said schlieren optical system;

said diffraction grating having a grating spacing that differs from the pixel spacing of said pixel pattern by an odd multiple of half the grating spacing.

2. Apparatus as defined by claim 1, wherein said pixel spacing is $S_p$, said grating spacing is $S_G$, and said grating spacing is related to said pixel spacing by $$S_G = (2/m)S_p$$

where m = 1, 3, 5, 7 . . . .

3. Apparatus as defined by claim 2, wherein said grating spacing is related to said pixel spacing by $S_G = 2S_p$.

4. Apparatus as defined by claim 2, wherein said pixel pattern is a pixel electrode pattern.

5. Apparatus as defined by claim 3, wherein said pixel pattern is a pixel electrode pattern.

6. Apparatus as defined by claim 2, wherein said optical modulating means includes at least one liquid crystal panel.

7. Apparatus as defined by claim 4, wherein said optical modulating means includes at least one liquid crystal panel.

8. Apparatus as defined by claim 5, wherein said optical modulating means includes at least one liquid crystal panel.

9. Apparatus as defined by claim 6, wherein said at least one liquid crystal panel comprises a plurality of liquid crystal panels corresponding to respective different colors.

10. Apparatus as defined by claim 7, wherein said at least one liquid crystal panel comprises a plurality of liquid crystal panels corresponding to respective different colors.

11. Apparatus as defined by claim 8, wherein said at least one liquid crystal panel comprises a plurality of liquid crystal panels corresponding to respective different colors.

12. A method for displaying images represented by electronic image information, comprising the steps of:

providing a light source;

optically modulating light from said light source, said optical modulation utilizing a pixel pattern and a diffraction grating, the pixel pattern being modulated with said image information;

providing a schlieren optical system for operating on said optically modulated light; and displaying an output of said schlieren optical system;

said diffraction grating being provided with a grating spacing that differs from the pixel spacing of said pixel pattern by an odd multiple of half the grating spacing.

13. The method as defined by claim 12, wherein said pixel spacing is $S_p$, said grating spacing is $S_G$, and said grating spacing is related to said pixel spacing by $$S_G = (2/m)S_p$$

where m = 1, 3, 5, 7 . . . .

14. The method as defined by claim 12, wherein said grating spacing is related to said pixel spacing by $S_G = 2S_p$.

15. The method as defined by claim 12, wherein said step of optically modulating comprises optically modulating with at least one liquid crystal panel.

16. The method as defined by claim 13, wherein said step of optically modulating comprises optically modulating with at least one liquid crystal panel.

17. The method as defined by claim 15, wherein said step of optically modulating with at least one liquid crystal panel comprises optically modulating with a plurality of liquid crystal panels corresponding to respective different colors.

18. The method as defined by claim 16, wherein said step of optically modulating with at least one liquid crystal panel comprises optically modulating with a plurality of liquid crystal panels corresponding to respective different colors.

19. The method as defined by claim 12, wherein said step of optically modulating utilizing a pixel pattern and a diffraction grating comprises providing a diffraction grating formed by an electrostatically deflected medium.

20. The method as defined by claim 13, wherein said step of optically modulating utilizing a pixel pattern and a diffraction grating comprises providing a diffraction grating formed by an electrostatically deflected medium.

* * * * *